United States Patent [19]

Kondo et al.

[11] 3,907,330
[45] Sept. 23, 1975

[54] SAFETY APPARATUS FOR STEERING WHEEL ASSEMBLY

[75] Inventors: Yutaka Kondo; Shuho Nishina, both of Toyota, Japan

[73] Assignee: Toyota Jidosha Kogyo Kabushiki Kaisha, Toyota, Japan

[22] Filed: Nov. 15, 1974

[21] Appl. No.: 524,263

[30] Foreign Application Priority Data

Dec. 3, 1973 Japan.............................. 48-139085

[52] U.S. Cl........................... 280/150 AB; 280/87 R
[51] Int. Cl.²......................................... B60R 21/10
[58] Field of Search...................... 280/150 AB, 87 R

[56] References Cited
UNITED STATES PATENTS

| 3,622,176 | 11/1971 | Byer | 280/150 AB |
| 3,625,543 | 12/1971 | Wolff | 280/150 AB |
| 3,632,136 | 1/1972 | Foltz | 280/150 AB |
| 3,756,617 | 9/1973 | Brown | 280/150 AB |
| 3,794,349 | 2/1974 | Fuller | 280/150 AB |
| 3,819,205 | 6/1974 | Dunford et al. | 280/150 AB |

*Primary Examiner*—Kenneth H. Betts
*Attorney, Agent, or Firm*—Stevens, Davis, Miller & Mosher

[57] ABSTRACT

A safety apparatus for a steering wheel assembly of a vehicle comprises a base plate mounted on the hub member of the steering wheel assembly, an inflatable bag assembled on the base plate to be inflated by pressurized fluid supplied therein from a pressure source, and a container which comprises a breakable pad body mounted on the base plate to contain the inflatable bag therein and a separable cylindrical core element inlaid within the side wall of the pad body. The core element is formed by a plurality of plate members which are connected to one another and include transverse recesses at their lower portions repectively. When the pad body is broken by the inflated bag, the core element is separated and bent outwardly to support the bottom portion of the inflated bag by the steering wheel.

10 Claims, 9 Drawing Figures

SAFETY APPARATUS FOR STEERING WHEEL ASSEMBLY

BACKGROUND OF THE INVENTION

The present invention relates to a safety apparatus for protecting the operator of a vehicle from injury by a steering shaft in the event of a collision, and more particularly to an improvement of an inflatable gas bag safety apparatus of the type in which a gas bag assembled with a steering wheel assembly is rapidly inflated to protect the operator from injuries caused by secondary impacts.

In a conventional inflatable gas bag safety device of this kind, when a gas bag contained within a container at the central portion of the steering wheel assembly is inflated in response to a vehicle collision, the inflated gas bag breaks the upper portion of the container and covers the steering wheel to protect the operator. However, the gas bag can inflate upwardly only due to the hard material of the side wall portion of the container so that the inflated gas bag can never be supported by the steering wheel at the inflated bottom portion thereof. This means that when the operator is thrown against the inflated bag, the operator may directly strike the steering wheel to be injured.

SUMMARY OF THE INVENTION

The main object of the present invention is, therefore, to provide an inflatable gas bag safety apparatus in which a gas bag is contained within a container assembled on the hub member of a steering wheel assembly and inflated sidewardly and upwardly by breakage of the side wall of the container in a vehicle collision so that the bottom portion of the inflated bag is securely supported by the steering wheel to protect the operator.

According to the present invention, there is provided a safety apparatus for a steering wheel assembly of a vehicle having a collision senser and a fluid pressure source for activating the safety apparatus in response to a signal generated from the senser, comprising a base plate mounted on the hub member of the steering wheel assembly, an inflatable bag assembled on the base plate to be inflated by pressurized fluid from the pressure source, and a container mounted on the base plate to contain the inflatable bag therein. The container comprises a breakable pad body mounted on the base plate to cover the inflatable bag and a separable cylindrical core element inlaid within the side wall of the pad body, the core element being formed with a plurality of plate members connected at their both sides with other plate members to be separated by the bag when inflated, each of the plate members including a transverse recess at its lower portion to be bent outwardly, whereby when the gas bag is inflated, the pad body is broken by the inflated bag and the core element is separated and bent outwardly so that the bottom portion of the inflated bag is supported by the steering wheel.

BRIEF DESCRIPTION OF THE DRAWINGS

Additional objects and advantages of the present invention will be more readily apparent from the following detailed description of preferred embodiments thereof when taken together with the accompanying drawings in which.

DESCRIPTION OF THE PREFERRED EMBODIMENT

Figure 1:
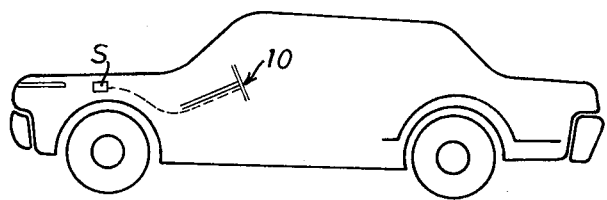
FIG. 1 is a schematic view of an arrangement of the present invention.
Figure 2:
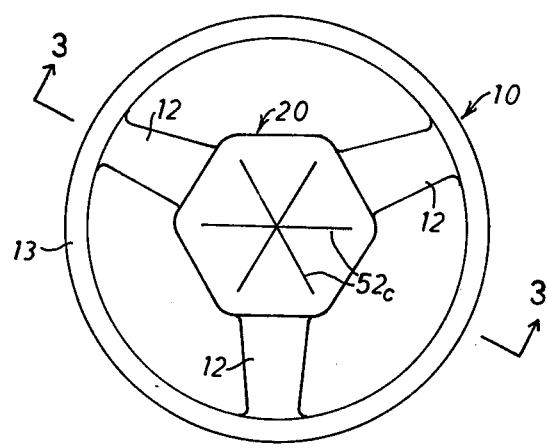
FIG. 2 is a front view of an embodiment of a safety apparatus in accordance with the present invention.
Figure 3:
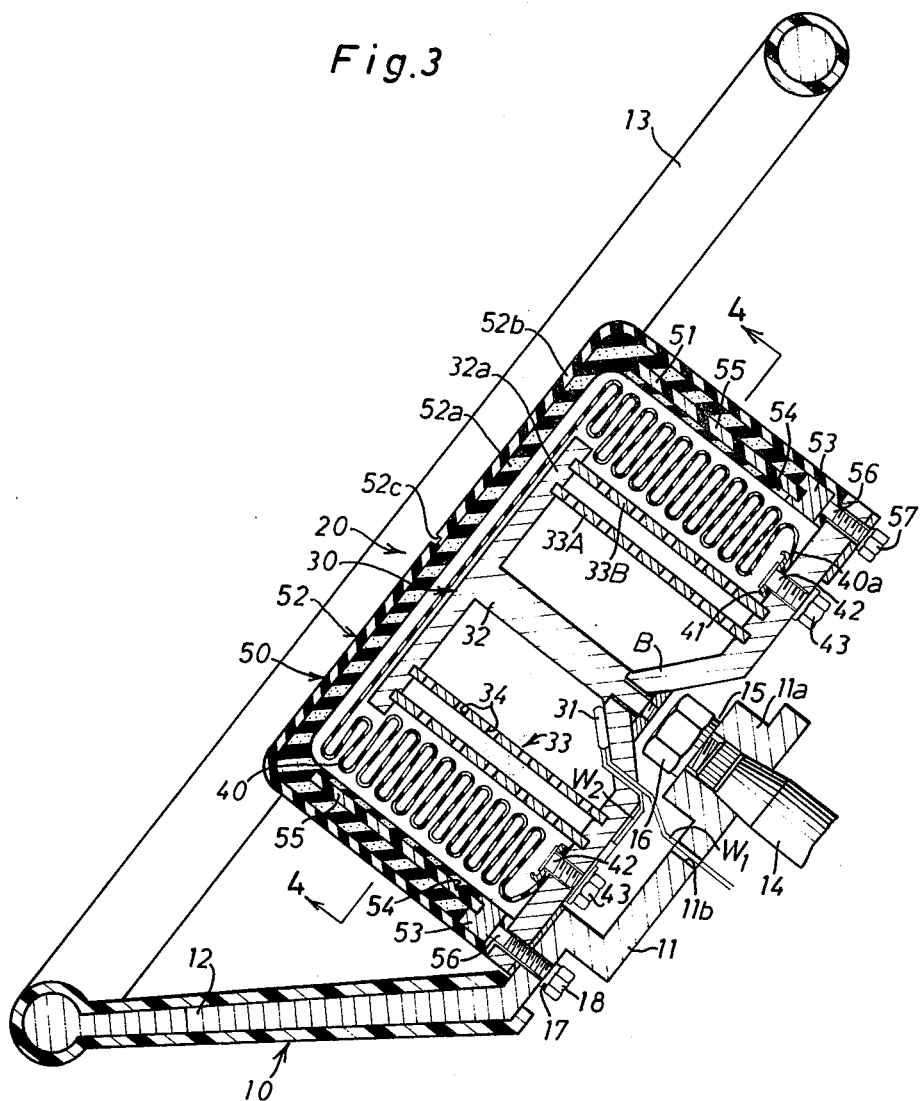
FIG. 3 is an enlarged cross-sectional view taken along line 3—3 in FIG. 2.

Referring now to FIGS. 1 through 5 of the drawings, there is disclosed a gas bag safety apparatus 20 for a steering wheel assembly 10 in accordance with the present invention. The steering wheel assembly 10 substantially comprises a hub member 11, three spokes 12 extending radially from the hub member 11 and a steering wheel 13 integrally fixed on the outer ends of the three spokes 12. The hub member 11 includes an integral boss 11a provided with a tapered hole to be engaged with the top end of a steering shaft 14 which firmly supports the boss 11a by way of a washer 15 and a lock nut 16. Assembled on the base portions of the spokes 12 through washers 17 by way of nuts 18 is a base plate B for the gas bag safety apparatus 20.

The gas bag safety apparatus 20 comprises a gas generator 30, an inflatable bag 40 and a container 50 which are assembled on the base plate B. The gas generator 30 is assembled at the central portion of the base plate B and comprises a supporting member 32 having a T-shaped cross-section which is mounted at the center of the base plate B, a cylindrical filter assembly 33 provided around the supporting member 32, a solid fuel element (not shown) such as propellant and the like contained within the filter assembly 33, and a primer 31 fixed on the inner wall of the base plate B to ignite the fuel element.

The filter assembly 33 is of a double-layered construction with two cylindrical filter elements 33A, 33B which are provided with a plurality of radial holes 34 and arranged to have a certain space to each other. The bottom ends of the filter elements 33A and 33B are fixed on the base plate B and the upper ends of them are also fixed on the outer margin of a disc portion 32a of the support member 32. The primer 31 is mounted on the base plate B within the gas generator 30. One terminal of the primer 31 is connected to a collision senser S mounted on a proper portion of a vehicle body as shown in FIG. 1 by way of a wire $W_1$ through the base plate B and a hole 11b of the hub member 11. The other terminal of the primer 31 is connected to the outer wall of the base plate B by way of a wire $W_2$, the base plate B being grounded through the vehicle body.

The inflatable bag 40 has the gas generator 30 inside thereof and the annular opening end of the bag 40 is hermetically secured on the base plate B by way of an annular retainer 41, bolts 42 and nuts 43. Thus, the inflatable bag 40 is normally collapsed and assembled within the container 50.

The container 50 is to contain therein and protect the gas generator 30 and the inflatable bag 40, and is formed by a pad body 52 provided therein with a core element 51. The core element 51 has a hexagonal cross-section and comprises six oblong plate members 55 of which the bottom ends are fixed on a support member 53. Each plate member 55 is connected with other plate members 55 at its both sides 55a and includes a transverse recess 54 at its lower inside wall respectively. The plate members 55 should preferably be connected to each other by suitable glue so that they are separable. The pad body 52 comprises a breakable body portion 52a made of hard urethane and the like having a U-shaped cross-section so as to contain integrally therein the hexagonal core element 51 and an outer layer 52b made of vinyl chloride which overlies the outer surface of the body portion 52a. To make the outer layer 52b breakable, provided are radial recesses 52c on the upper surface of the outer layer 52b to cover the upper opening of the hexagonal core element 51. The flange portion of the opening end of the outer layer 52b is fixedly mounted on the outer rim of the base plate B by way of bolts 56 secured on the bottom of the support member 53 and nuts 57. Three of these bolts 56 are utilized for assembling the gas bag safety apparatus 20 on the base portions of the spokes 12.

Figure 5:
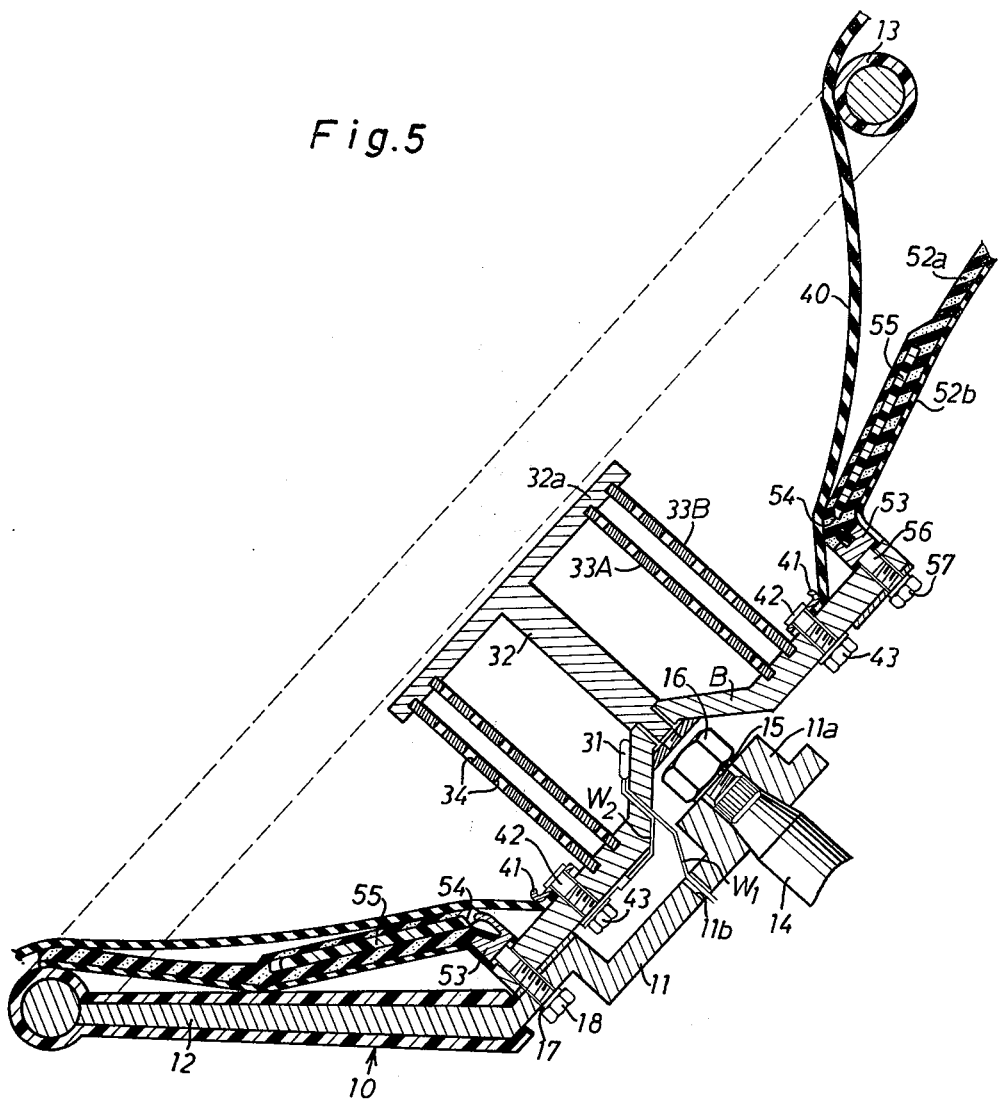
FIG. 5 shows a cross-section of the safety apparatus with a gas bag inflated.

When the vehicle is normally travelling, the gas bag safety apparatus 20 may not be broken by any external force given thereto from the operator due to the construction of the container 50 including the six plate members 55 which are connected to each other at their side ends 55a and the pad body 52. In a vehicle collision, the collision senser S triggers the primer 31 to ignite the fuel element. This burns the fuel element explosively to generate a big volume of gas which jets into the collapsed bag 40 through the plural radial holes 34 of the filter assembly 33. In this instance, the heat and noise of the gas are decreased by the filter assembly 33. The increased pressure within the bag 40 expands the gas bag 40 to push the pad body 52 and the hexagonal core element 51 outwardly. When the gas pressure within the bag 40 exceeds a predetermined value, the radial recesses 52c provided on the upper portion of the container 50 are broken and the pad body 52 is broken outwardly. Simultaneously, the six plate members 55 of the core element 51 are separated and bent outwardly at the transverse recesses 54 thereof. This inflates the gas bag 40 sidewardly as well as upwardly and yet the bottom face of the inflated bag 40 is well supported by the steering wheel 13 as shown in FIG. 5. Thus, the secondary impact energy given to the inflated gas bag 40 by the operator is well absorbed and the operator remains safe.

Figure 6:
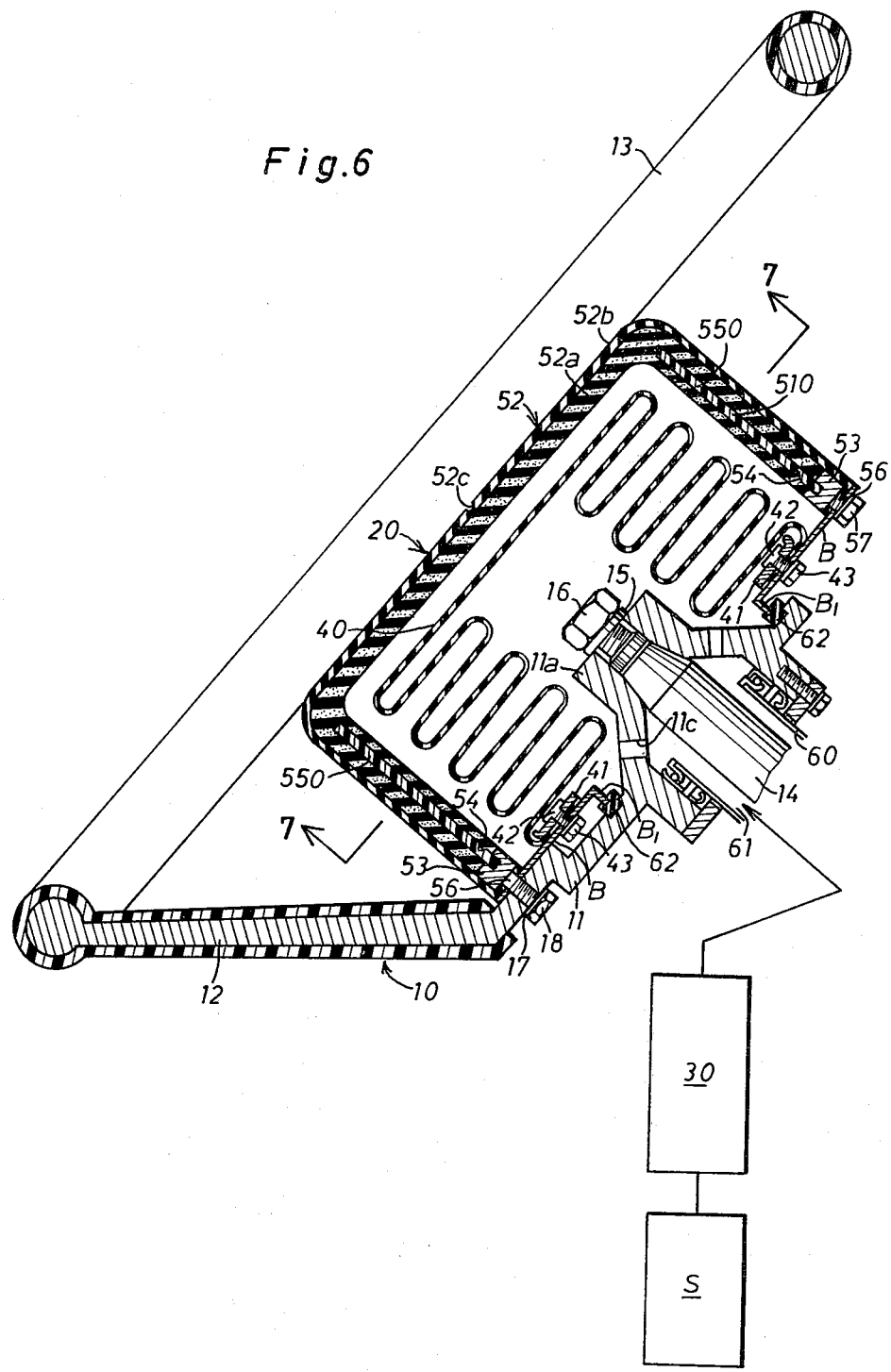
FIG. 6 shows an enlarged vertical cross-section of another embodiment of the present invention.
Figure 7:
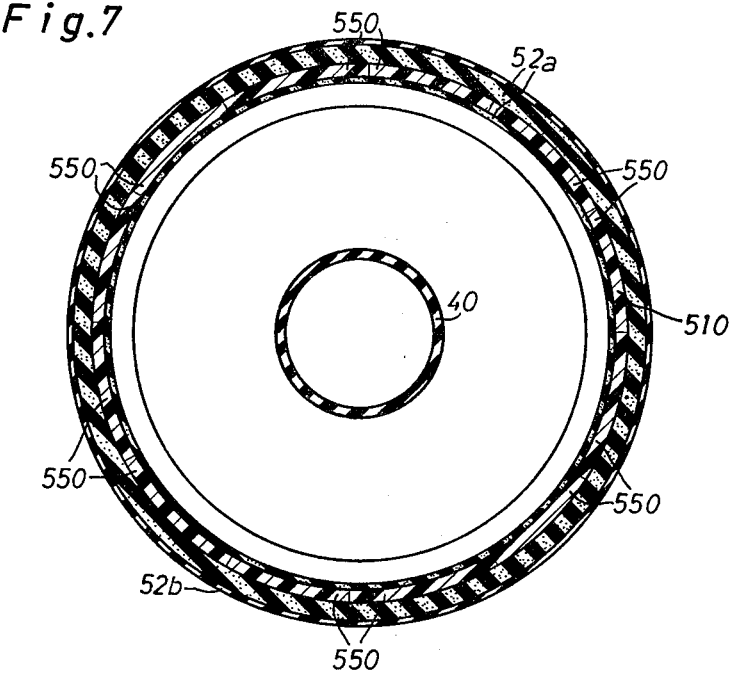
FIG. 7 is a cross-sectional view taken along line 7—7 in FIG. 6.

In FIGS. 6 and 7, there is disclosed a modification of the present invention wherein a gas generator or a high pressure gas cylinder 30 is provided outside of the gas bag safety apparatus 20. In this modification, a gas passage 61 is formed between the steering shaft 14 and a column tube 60 and communicated with the interior of the gas bag 40 through passages 11c provided on the hub member 11. The base plate B is formed annularly and the inner rim $B_1$ of the base plate is hermetically fixed on the hub member 11 through an annular seal 62. As best shown in FIG. 7, the hexagonal core element 51 of the previous embodiment is replaced with a circular core element 510 formed by twelve plate members 550. With this modification, when the collision senser S operates in response to a vehicle collision, the gas generator 30 supplies jet of gas into the collapsed gas bag 40 through the gas passage 61 and the passages 11c of the hub member 11. All other constructions are same as those in the previous embodiment and the same reference numerals and characters show the same component parts and portions to avoid unnecessary repetition of the explanation.

Figure 4:
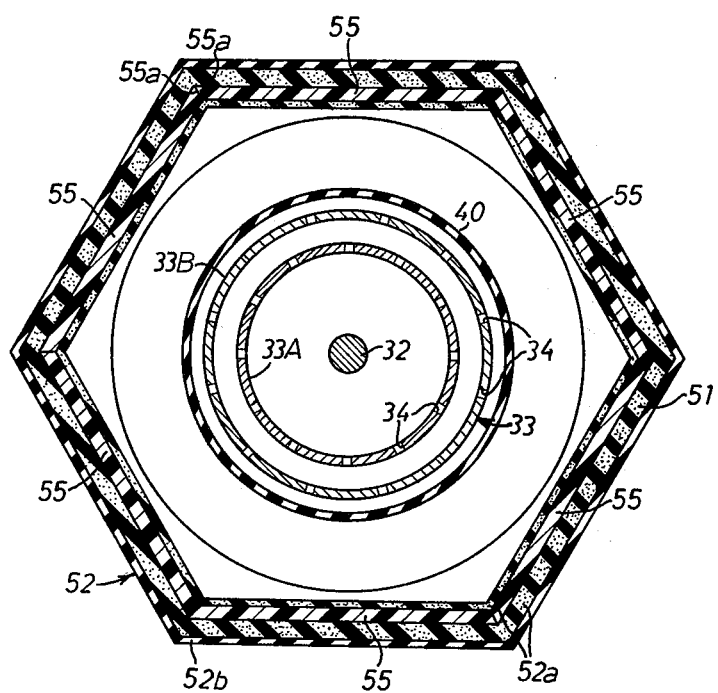
FIG. 4 is a cross-sectional view taken along line 4—4 in FIG. 3.
Figure 8:
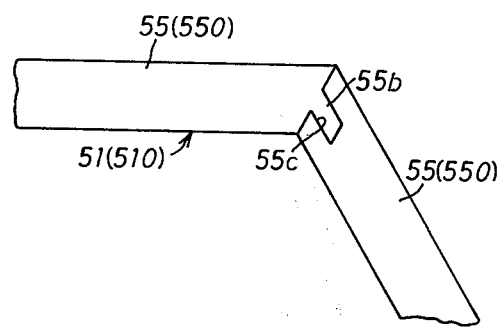
FIGS. 8 and 9 show enlarged partial views of another modifications of a core element of the safety apparatus.
Figure 9:
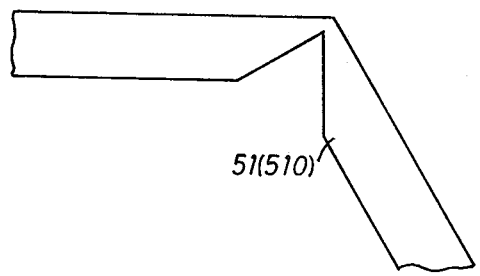

Although the preferred embodiments apply the hexagonal core element 51 or the circular core element 510 as shown in FIGS. 4 and 7, an oblong or halfcircular shape may be applicable by using proper numbers of the plate members. FIG. 8 shows another way to construct the core element 51 or 510 separable by providing a projected portion 55b on an engaging side of the plate member and a corresponding indent 55c of the engaging side of another plate member. FIG. 9 depicts another way to make the core element 51 or 510 separable, wherein the core element 51 or 510 is integrally made with recesses at the portions corresponding to the engaging sides. Furthermore, in the preferred embodiments, although the transverse recesses 54 are provided at the lower inside wall of the plate members 55 or 550 to bend the plate members outwardly, these recesses 54 may be provided at the lower outside wall of the plate members to have same function and effect.

Although a certain specific embodiment of the present invention has been shown and described, it is obvious that many modifications and variations thereof are possible in light of these teachings. It is to be understood therefore that within the scope of the appended claims, the invention may be practiced otherwise than as specifically described herein.

What is claimed is:

1. In a safety apparatus for a steering wheel assembly of a vehicle having a collision senser and a fluid pressure source for activating said safety apparatus in response to a signal generated from said senser, comprising a base plate mounted on the hub member of said steering wheel assembly, an inflatable bag assembled on said base plate to be inflated by pressurized fluid from said pressure source, and a container mounted on said base plate to contain said inflatable bag therein, the improvement wherein said container comprises a breakable pad body mounted on said base plate to cover said inflatable bag and a separable cylindrical core element inlaid within the side wall of said pad body, said core element being formed with a plurality of plate members connected at their both sides with other plate members to be separated by said bag when inflated, each of said plate members including a transverse recess at its lower portion to be bent outwardly, whereby when said gas bag is inflated, said pad body is broken by said inflated bag and said core element is separated and bent outwardly so that the bottom portion of said inflated bag is supported by the steering wheel.

2. A safety apparatus for a steering wheel assembly as claimed in claim 1, wherein said separable cylindrical core element is designed to have a polygonal cross-section.

3. A safety apparatus for a steering wheel assembly as claimed in claim 1, wherein said separable cylindrical core element is designed to have a circular cross-section.

4. A safety apparatus for a steering wheel assembly as claimed in claim 1, wherein said pad body comprises a body portion made of breakable synthetic resin to contain integrally therein said core element and an outer layer to cover the outer surface of said body portion, said outer layer being provided on its outer surface with radial recesses to be broken when said bag is inflated.

5. A safety apparatus for a steering wheel assembly as claimed in claim 1, wherein each of said plate members forming said core element is provided at its lower inside wall with said transverse recess to be bent outwardly.

6. A safety apparatus for a steering wheel assembly as claimed in claim 1, wherein each of said plate members forming said core element is provided at its lower outside wall with said transverse recess to be bent outwardly.

7. A safety apparatus for a steering wheel assembly as claimed in claim 1, wherein said plate members forming said core element are adhered at their both sides to other plate members to be separated by said gas bag when inflated.

8. A safety apparatus for a steering wheel assembly as claimed in claim 1, wherein said plate members forming said core element are coupled at their both sides to other plate members to be separated by said gas bag when inflated.

9. A safety apparatus for a steering wheel assembly as claimed in claim 1, wherein said core element is provided at each corner of its wall with a breakable vertical recess to be separated.

10. A safety apparatus for a steering wheel assembly as claimed in claim 1, wherein said plate members forming said core element are secured at their bottom ends on said base plate.

* * * * *